No. 676,700. Patented June 18, 1901.
C. F. ROPER.
GRINDING MACHINE.
(Application filed Dec. 31, 1900.)
(No Model.) 5 Sheets—Sheet 1.

Witnesses,
Edward F. Allen
Thomas L. Drummond

Inventor,
Charles F. Roper,
by Crosby Gregory
attys.

No. 676,700. Patented June 18, 1901.
C. F. ROPER.
GRINDING MACHINE.
(Application filed Dec. 31, 1900.)
(No Model.) 5 Sheets—Sheet 2.

Witnesses,
Edw'd H. Allen.
Thomas J. Drummond.

Inventor,
Charles F. Roper,
by Crosby & Gregory,
attys.

No. 676,700. Patented June 18, 1901.
C. F. ROPER.
GRINDING MACHINE.
(Application filed Dec. 31, 1900.)
(No Model.) 5 Sheets—Sheet 3.

Witnesses,
Edward H. Allen
Thomas A. Drummond

Inventor,
Charles F. Roper,
by Crosby Gregory.
attys

No. 676,700. Patented June 18, 1901.
C. F. ROPER.
GRINDING MACHINE.
(Application filed Dec. 31, 1900.)
(No Model.) 5 Sheets—Sheet 4.

Witnesses,
Edward G. Allen.
Thomas J. Drummond.

Inventor,
Charles F. Roper,
By Crosby Gregory.
attys

No. 676,700. Patented June 18, 1901.
C. F. ROPER.
GRINDING MACHINE.
(Application filed Dec. 31, 1900.)
(No Model.) 5 Sheets—Sheet 5.

Witnesses,
Edward F. Allen.
Thomas J. Drummond

Inventor:
Charles F. Roper,
by Crosby Gregory,
attys.

UNITED STATES PATENT OFFICE.

CHARLES F. ROPER, OF HOPEDALE, MASSACHUSETTS, ASSIGNOR TO DRAPER COMPANY, OF SAME PLACE AND PORTLAND, MAINE.

GRINDING-MACHINE.

SPECIFICATION forming part of Letters Patent No. 676,700, dated June 18, 1901.

Application filed December 31, 1900. Serial No. 41,577. (No model.)

*To all whom it may concern:*

Be it known that I, CHARLES F. ROPER, a citizen of the United States, and a resident of Hopedale, county of Worcester, and State of Massachusetts, have invented an Improvement in Grinding-Machines, of which the following description, in connection with the accompanying drawings, is a specification, like characters on the drawings representing like parts.

This invention relates to grinding-machines wherein it is desired to shape or polish articles which are of varying diameter throughout their length.

The embodiment of my invention herein illustrated comprises a machine which is especially adapted for grinding, shaping, and polishing spindle-blades such as are used in the textile art, though I would state that the invention is not limited to such use, but may be incorporated in any grinding-machines which are used for shaping and polishing articles of varying diameter. As is well known, spindle-blades are largest at their central portion and taper toward each end, and in use it is important that they should be smooth and of uniform size. The machine hereinafter described and which is especially adapted to accomplish this result comprises generally a grinding-surface, a work-holder, a templet for controlling the position of the work-support relative to the grinding or abrading surface, said templet corresponding in shape to the shape of the spindle-blades, and mechanism for advancing the grinding-surface toward the work-holder during the grinding process. The work-holder is shown as a reciprocating member, and my invention also comprises means for moving the said work-holder back and forth in front of the grinding-surface at a substantially uniform speed, so that every portion of the spindle will be subjected to the same grinding action.

In the drawings, Fig. 4 is a section on the line $xx$, Fig. 1. Fig. 5 is a detail showing the mechanism for adjusting the position of the grinding-surface with reference to the work-holder.

The frame of the machine is of any suitable shape and is designated in the drawings by A.

B is the grinding or abrading surface, shown in this instance as a wheel, of any suitable abrading material, mounted upon a shaft B', which is rotated by any suitable means and is supported in bearings C, carried by the frame A, said bearings being of any suitable construction and being adjustable, as hereinafter described, for the purpose of advancing the grinding-surface toward the work-holder.

The work-holder as an entirety is designated by the reference-numeral 2, and it is shown as having its under side rounded, as at 3, said rounded portion being supported for rocking movement in suitable bearings 4, mounted upon the frame A. The object of thus giving the work-holder a rounded surface is to enable it to oscillate in the bearings, so as to bring the work to and from the grinding-surface, as called for by the templet. The means for giving this oscillating movement to the work-holder comprises a lever 5, rigid with said work-holder, said lever having at one end a roll 6, which bears upon and is guided by the templet 7, suitably secured to the frame A, said templet being of such a shape as to give to the work-holder the requisite movement to and from the grinding-surface.

In order to hold the roll 6 in contact with the templet 7, I have provided the guide 8, which is yieldingly held against the said roll, and thereby holds the roll against the templet by means of springs 9, said springs bearing at one end against the guides 9ª, suitably fixed to the frame A, through which guides pass bolts 10, rigidly connected to the guide 8, and at their other end upon nuts upon said bolts.

During the grinding and polishing operation the work-holder 2 is reciprocated in the bearings 4 by means of the crank D and a pitman 38, as will be hereinafter described.

The work-holder 2 includes a head-stock 12 and a tail-stock 17, between which the work is held, the head-stock 12 being provided with any suitable chuck, as 13, in which one end of the work is adapted to be clamped, and fast and loose pulleys 14 and 15, upon which run any suitable belt for giving a rotary movement to the chuck, and consequently to the work, a belt-shipper 16 being provided whereby the belt may be shifted from the fast to the loose pulley and vice versa, whenever it is desired to stop or start the rotation of the work.

The tail-stock 17 carries the dead spindle or center 19, said spindle or center being recessed on the side toward the grinding-surface, as shown at 20, and provided with a groove $20^a$, in which one end of the work is adapted to rest for turning movement.

Both the head and tail stocks are adjustably mounted upon the base portion 11 of the work-holder 2, so they may be adjusted to accommodate work of different lengths, and they may be clamped in their adjusted position by any usual devices.

With the construction above described it will be seen that as the work-holder carrying the spindle-blade to be ground is reciprocated by the crank D the templet 7 will so guide the roll 6 on the end of the lever 5 as to rock the work-holder and throw the work toward and from the grinding-surface, and by arranging the said templet as shown, with its lowest portion near the center thereof, it will be evident that the work-holder carrying the spindle will be carried away from the abrading-surface as the larger portion of the spindle is being ground and toward the said grinding-surface as the ends of said spindle are being ground, it being understood, of course, that the spindle-blade is continuously rotated during the grinding operation.

In order to steady the work, so that there shall be no chattering, I have provided the work-holder with a work-rest, which in this instance comprises the slide or carrier 22, adjustably mounted for longitudinal movement upon the said base 11 of the work-holder in any suitable or usual way, which slide or carrier has on its upper face a series of parallel ribs 25', forming between them pockets or guideways 25, in which are adjustably mounted a series of work-supporting devices in the nature of blocks 27, each block having on its outer edge and in line with the centers of the head and tail stocks a groove 23, shaped to fit the work. Each block 27 is capable of independent adjustment, as above stated, such adjustment being effected in any suitable way, as by means of the adjusting-bolts 24, which are rotatably mounted in the slide 22, but held against longitudinal movement, said bolts having their screw-threaded portions engaging screw-threaded sockets in the said blocks. By making the grooves 23 in the edges of the said blocks of varying depths to fit the shape of the article being ground and by means of the independent adjusting devices for each block it is possible to construct a work-rest which will bear evenly against the work at all points, and thus prevent the same from yielding or giving during the grinding operation. This is highly essential when it is desired to grind any article to an exact size, as in the case of spindle-blades.

As stated above, the grinding of the work is accomplished by reciprocating the same in front of a rotating grinding-surface, and in order to produce an article of the proper size throughout its entire length it is essential that the work-holder be given an even or uniform reciprocating movement, so that every portion of the work shall be subjected to the same grinding action.

It is obvious that were the work-holder given its reciprocations by an ordinary crank and pitman it would have a varying speed throughout its stroke, the movement thereof being most rapid at the central portion of the stroke and slowest at the ends of the stroke, with the result that the end portions of the work would dwell in front of the grinding-surface for a much longer period than the central portion thereof. With the ordinary form of crank-motion, therefore, different portions of the work would receive different grinding actions, and where spindles are being ground, as illustrated in the drawings, the ends thereof would be ground to a greater extent than the central portion, and the result would be a non-uniform taper in the finished spindle. To overcome this difficulty, I have devised a special form of crank-arm which I have termed a "differential" crank-arm, said crank-arm being so constructed as to give to the work-holder a gradual acceleration as it approaches and leaves each end of the stroke and a retarded motion during the central portion of the stroke, thus counteracting or balancing the uneven reciprocating motion due to the ordinary crank-motion and giving to the work-holder a resultant reciprocation which is uniform throughout the entire length of the stroke.

The main shaft 43 of the machine, which shaft is supported in any suitable bearings upon the frame A, carries at one end a worm 42, which meshes with a worm-gear 41, mounted upon shaft 40, said shaft being supported in any suitable bearings $40^a$, fixed to the arm F of the frame A. The upper end of the shaft 40 carries the said differential crank-arm D, said crank-arm being connected to the work-holder by the pitman 38, as described above. One form of differential crank-arm is illustrated in Figs. 9 to 15, and it comprises two members, one of which is fast on the shaft 40 and of course has the motion of an ordinary crank-arm and the other of which is loose on said shaft and is in the nature of a compensating member, the compensating member being driven or rotated by the fast member, and suitable mechanism is employed to give the compensating member a varying differential motion with respect to the fast member, so that when the work-holder approaches or recedes from the end of its stroke said compensating member is given a gradually increased or decreased acceleration and during the middle portion of the stroke a retarded motion with reference to that of the fast member of the crank-arm, thus counteracting or balancing the varying right-line movement due to an ordinary crank-arm and giving to the pitman, and consequently the work-holder, a resultant uniform reciprocation. The two members of the differential crank-arm are designated by 44 and 37, respectively, and the member 44 is rigidly fastened to the shaft 40, preferably by the usual key, while the compensating member 37 is loosely mounted upon said shaft and is pivotally connected to the pitman 38. The end of the arm or member 44 has pivotally mounted thereon the segmental gear 45, the connecting means between the gear and the arm being the pin 46, which passes through apertures 47 and 48 in the arm and gear, respectively. The other member or arm 37 of the differential crank D is in the nature of a compensating member and has rigidly secured thereto, as by screws 53, a coöperating segmental gear 52, which meshes with the segmental gear 45. The gear 45 has integral therewith the double arm 49, between the members of which is supported a roll 50, which roll is adapted to bear against and be operated by the cam 51, rigidly secured to the arm F of the frame A. The cam 51 is a double cam, both portions thereof being alike, and each portion has the point or rise $54^{\times}$, the flattened surface $60^{\times}$, and the eccentric cam-surface 60, all as illustrated, the cam-surfaces 60 rising gradually to the flattened portions $60^{\times}$ at a rate which compensates for the rate of increase in the speed of the crank, and each point $54^{\times}$ is so situated that the roll 50 is engaged thereby just as the crank-arm is about to pass either dead-center.

In the case of an ordinary crank-motion with the crank-arm on a dead-center it will be obvious that in moving through the first angle of forty-five degrees the effective movement of the crank-arm will be comparatively slight—that is, it will be effective to move the pitman or other reciprocating body to which it is connected through only a short distance, while during the movement of the crank-arm through the second forty-five-degree angle the reciprocating body will be brought to the center of its stroke. To compensate for this uneven reciprocating movement, I have constructed my cam 51 as shown, and its operation will now be described, it being understood that the resistance of the work-holder acting through the pitman 38 will tend to keep the roll 50 at all times against the working face of cam 51.

Figure 1:
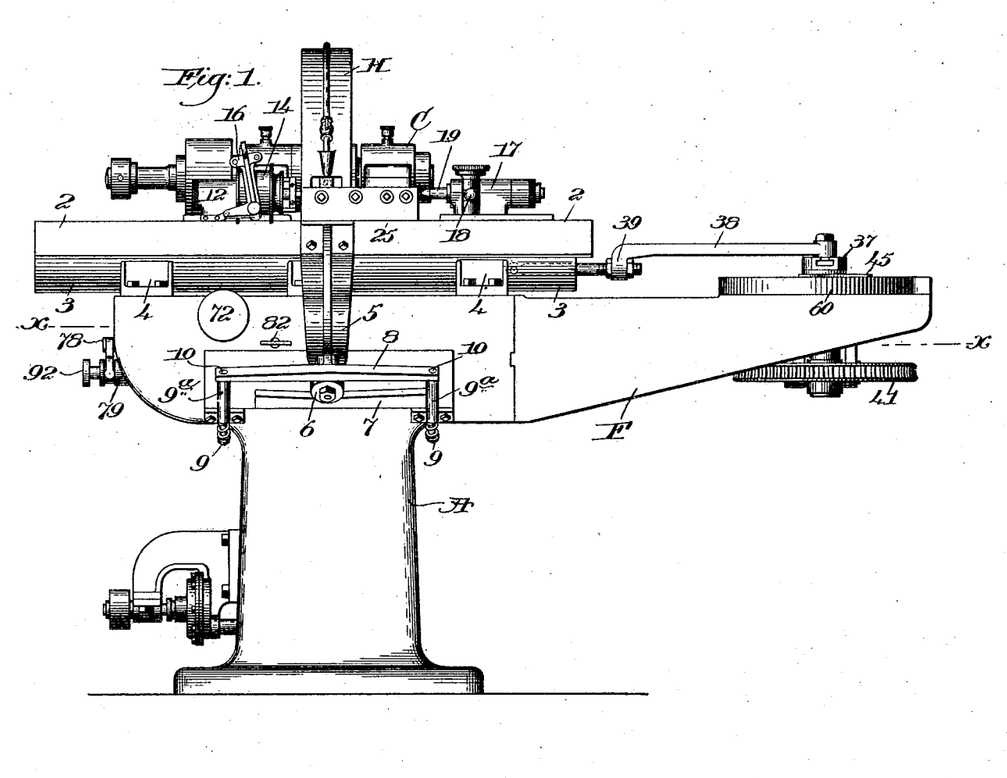
Figure 1 is a front elevation of a machine embodying my invention.
Figure 2:
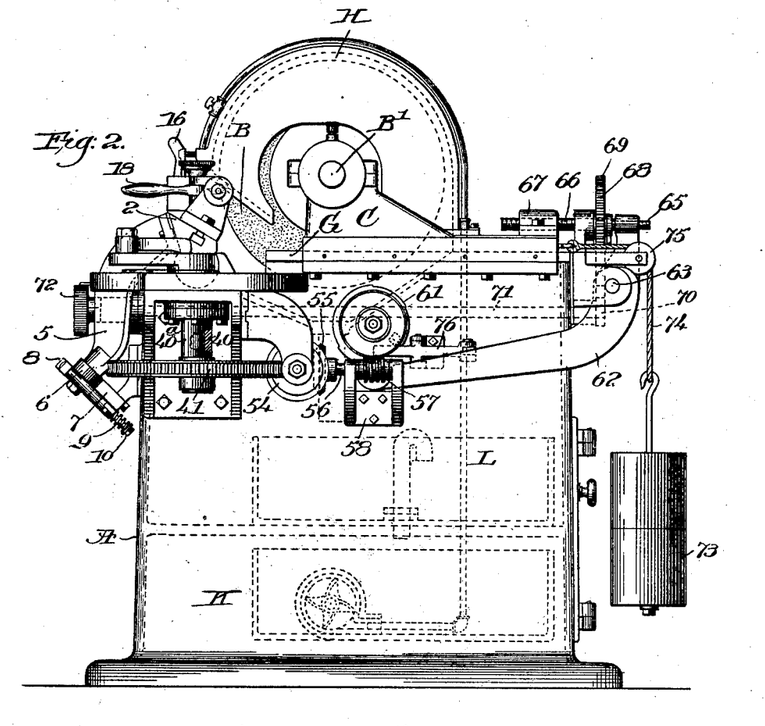
Fig. 2 is an end elevation thereof.
Figure 3:
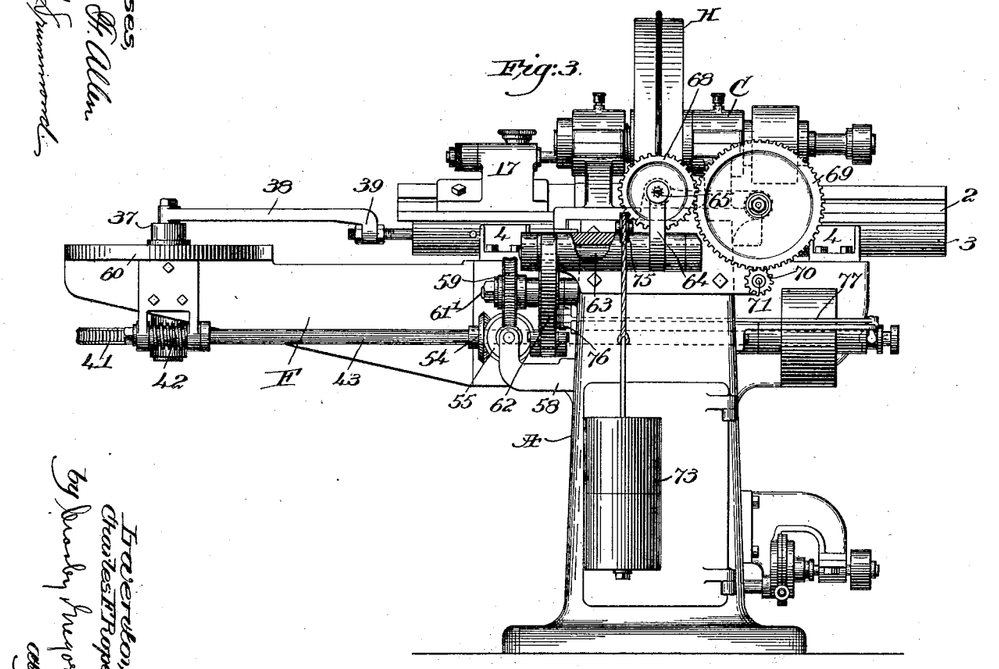
Fig. 3 is a rear elevation.
Figure 6:
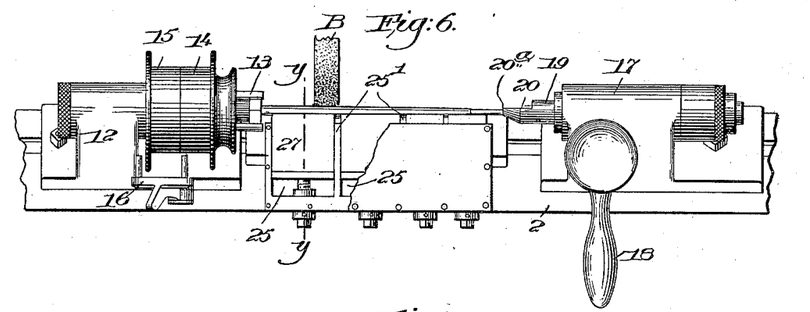
Fig. 6 is a plan view of a portion of the work-holder.
Figure 7:
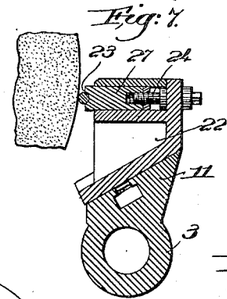
Fig. 7 is a section on the line $yy$, Fig. 6.
Figure 8:
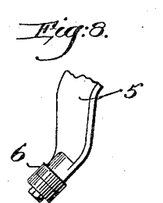
Fig. 8 is a detail of the guiding means for the work-holder.
Figure 9:
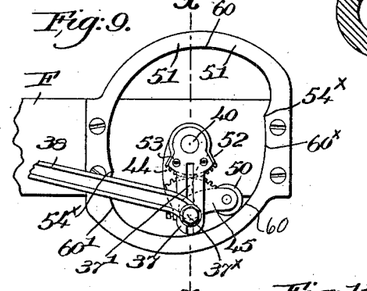
Figs. 9 to 15 are detail views showing a mechanism for giving a uniform movement to the work-holder.
Figure 10:
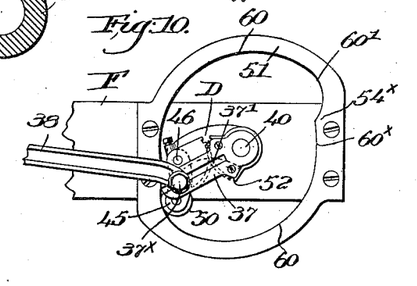

Assuming that the crank-arm is on a dead-center at the right in Figs. 9 and 10, in which case the roll 50 will be just over the crown of the rise or point $54^{\times}$, and assuming that the differential crank-arm is moving in the direction of the hands of a clock, it will be seen that as member 44 moves through the first portion of the stroke the roll 50 in passing over the flattened portion $60^{\times}$ operates to turn the gear 45 backward, and thus through gear 52 to give to the compensating member 37 a forward differential movement, thus increasing the effective motion of the crank-arm. As the differential crank-arm D moves into the position shown in Fig. 9 the cam-surface 60, which is in the nature of a receding cam-surface—that is, one with a progressively-increased radius—allows the gear 45 to gradually swing clockwise upon its pivot 46, and because of its intermeshing with gear 52 the arm 37 will be given a backward differential movement with respect to the arm 44, thus giving to the work-holder a sufficiently-retarded movement to compensate for the accelerated motion normally derived from a crank-motion at this point of the stroke. When the differential crank-arm reaches the position shown in Fig. 10, in which position an ordinary crank-arm would give to the work-holder a progressively-retarded movement, the roll 50 engages the incline or rise 60', which operates to swing the gear 45 in a direction opposite to the movement of the hands of a clock, and thus through gear 52 gives to the compensating member 37 a forward differential movement, which counteracts for the retardation due to the movement of the crank-arm past its dead-center. A quick reverse is given to the work-holder by means of the point $54^{\times}$, and after the roll 50 passes this point the operations above described are repeated. It will thus be seen that my differential crank-arm gives a uniform reciprocation to the work-holder by accelerating the normal speed thereof at the ends of the stroke and retarding the same during the central portion of the stroke, and of course such uniform reciprocation is highly essential in securing an evenly-ground spindle.

Figures 11, 12, 13:
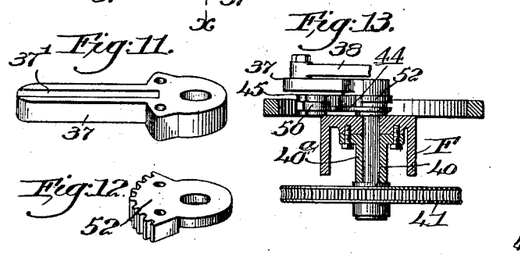
Figure 14:
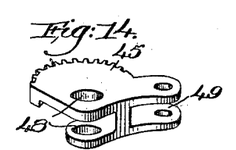
Figure 15:
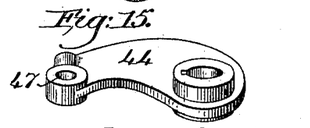

Referring now to Figs. 9, 10, and 11, it will be seen that the compensating member 37 is provided with a slot 37', in which the bolt $37^{\times}$ in the end of the pitman 38 is adjustably mounted, whereby effective length of said compensating member 37 may be altered, thus affording a ready adjustment of the length of the reciprocation of the work-holder.

Another feature of my invention consists in providing a mechanism for slowly advancing the grinding-surface toward the work during the grinding or polishing of the latter, the advancing movement being an intermittent or step-by-step movement, and in further providing a stop mechanism which is adapted to be operated when the polishing or grinding operation on each piece of work has been completed. In the mechanism shown I have so timed the gears that this stop mechanism will be thrown into operation whenever the work-holder has made three complete reciprocations, and by "complete reciprocation" I mean a double reciprocation—that is, a movement to the right and a corresponding movement to the left—so that in the grinding operation each spindle-blade passes back and forth in front of the grinding-surface six times.

It will be evident that were both the work-holder and grinding-surface mounted in stationary bearings, with no provision for adjusting or advancing one toward the other during the grinding operation, when the work had passed in front of the grinding-surface once no grinding action would take place on the return movement.

As stated above, my machine, as illustrated, is adapted to pass the work across the grinding-surface six times during the grinding operation, and in order that the grinding or polishing action may be performed at each reciprocation of the work I have provided the mechanism above referred to, which operates to intermittently advance the grinding-surface toward the work during the grinding operation, each advance movement of the grinding-surface being accomplished at the end of the stroke of the work-holder. This mechanism is shown as an arm 62, pivotally supported upon any suitable shaft 63 on the frame and carrying in the end 64 thereof a set-screw 65, which is adapted to bear against the end of a threaded shaft 66, supported in a threaded bearing 67 on the bearing C of the grinding-surface. The frame A of the machine is provided with suitable ways G for guiding the bearing C in its movement to and from the work. The lever 62 is operated by a cam 61, said cam being carried by any suitable shaft 61', which has rigidly connected therewith the worm-wheel 59, which engages and is driven by the worm 57 on shaft 56. The shaft 56 is supported in any suitable bracket 58 upon the frame A and carries at one end the bevel-gear 55, which is adapted to coöperate with the bevel-gear 54, rigidly fixed to the main shaft 43.

From the above description it will be seen that the rotation of the main shaft is communicated through the gearing described to the cam 61, and said cam is of such a shape that during its rotation the lever 62 will be given a slight intermittent or step-by-step movement which is communicated to the bearing C of the grinding-surface B, the movement of the bearing occurring at the end of each stroke, and I would remark that the gearing for driving the cam 61 is so timed with reference to the gearing for reciprocating the work-support that during a single rotation of the cam 61 the work-support will be given three complete reciprocations.

Figures 16, 17:
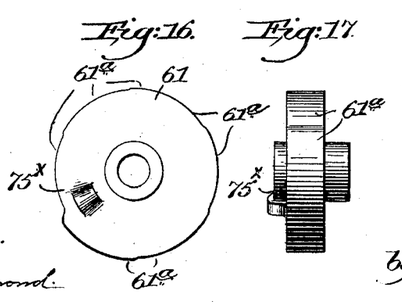
Figs. 16 and 17 are detail views of the cam for imparting to the grinding-surface its advancing movement.

As seen in Fig. 16, the face of the cam 61 comprises six concentric portions 61$^a$ of equal length, each having a slightly-greater radius than the preceding portion, so that the cam 61 is a stepped cam and will therefore give to the arm 62 the intermittent or step-by-step motion above referred to. The concentric portions 61$^a$ are of such a length and the gearing is so timed that during each stroke of the work-holder the said concentric portions 61$^a$ are operative to hold the arm 62 stationary; but at the end of each stroke or single reciprocation the cam is turned, so as to bring the next succeeding concentric portion into operative position and advance the grinding-surface slightly just before the return stroke is commenced. It will thus be seen that during each stroke of the work-holder the bearing for the grinding-surface is stationary, but that at the end of each stroke the said bearing and the grinding-surface are slightly advanced.

In order to adjust the bearing C of the grinding-surface B for wear, I have provided the hand-operated mechanism, which consists of a gear 68, splined upon the threaded shaft 66, as seen in Fig. 5, so that said gear and shaft must rotate together, but can have independent longitudinal movement, the said shaft 66 being screw-threaded into bearing 67, rigid with the bearing C for the grinding-surface, as above described. The gear 68 meshes with gear 69, fast upon the shaft 71, which shaft carries at one end a milled head 72, adapted to be operated by hand. The said gear 68 bears against the support 91, and said support has an aperture 90, through which the shaft 66 loosely passes, as seen in Fig. 5. With the arrangement of parts above outlined it will be evident that when the screw 66 is turned in a direction opposite to the hands of a clock or backward by means of the gear 68 and shaft 71 such rotation of the said shaft 66 will impart to the bearing C a movement toward the work, by reason of the fact that the end of the screw 66 abuts against the set-screw 65 in the lever 64 and is thereby held from movement toward the right. A reverse movement of the shaft 66 will allow the bearing C to be retracted from the work under the influence of the weight 73, which is connected to the bearing C by any suitable means, such as a rope 74, passing over pulley 75, the said weight operating to hold the threaded shaft 66 constantly in contact with the screw 65. I may also adjust the position of the grinding-surface by varying the position of the screw 65 in the arm 64, as will be readily understood.

In order to stop the machine when the work-holder has made three complete reciprocations and the cam 61 has made one revolution, said cam is provided with a lug 75$^\times$, which is adapted to engage a lever 76, connected, through spring-pressed rod 77 and lever 78, to any suitable clutch mechanism 79. To hold the clutch disengaged when it has been forced into this position by the lug 75$^\times$, a spring-pressed rod 80 is provided, having a beveled end, which is engaged by a collar 81 on the rod 77 as the said rod is moved to the right. (See Fig. 4.) When the rod 77 has moved to its extreme position to the right, thereby disengaging the clutch, the spring-pressed rod 80 will snap in behind the collar 81, thereby locking the same until it is desired to start the machine again. The said rod 80 may be retracted by means of the hand 82, thereby allowing the spring 83 on the rod 77 to throw the clutch into engagement again.

The grinding-surface B is provided with any usual hood or shield H, and some well-known means are provided for keeping the wheel moist during the grinding operation—such, for instance, as a rotary pump K, which forces water through the pipe L onto the surface of the wheel. The shield and the means for moistening the wheel are well known and do not need further description here.

It will be evident that various changes can be made in my device without departing from the spirit of the invention.

The end of the main shaft is provided with any suitable stop 92 to limit the movement of the movable clutch member when the clutch is disengaged.

Having fully described my invention, what I claim as new, and desire to secure by Letters Patent, is—

1. In a grinding-machine, a grinding-surface, a work-holder, means to reciprocate the work-holder, means to advance the grinding-surface toward the work-holder at the end of each reciprocation thereof, said means including a lever and a stepped cam for actuating said lever.

2. In a grinding-machine, a rotary grinding-surface, a work-holder, means to reciprocate the work-holder, automatically-operating means to advance the grinding-surface toward the work-holder at the end of each reciprocation thereof, and a templet controlling the position of the work with relation to the grinding-surface to thereby give the requisite shape to the completed article.

3. In a grinding-machine, a grinding-surface, a work-holder, means to reciprocate the work-holder, means to advance the grinding-surface toward the work-holder at the end of each reciprocation thereof, and means to automatically stop the operation of the machine when the work has passed in front of the grinding-surface a predetermined number of times.

4. In a grinding-machine, a grinding-surface, a work-holder, means to automatically advance one of said parts toward the other during the grinding operation, and a templet controlling the position of the work relative to the grinding-surface.

5. In a grinding-machine, a grinding-surface, a work-holder, a templet for controlling the position of the work relative to the grinding-surface, and means to automatically advance the grinding-surface toward the work during the grinding operation.

6. In a grinding-machine, a grinding-surface, a work-holder, automatic mechanism to intermittently advance the grinding-surface toward the work-holder during the grinding operation, means to reciprocate the work-holder, and a templet controlling the position of the work relative to the grinding-surface, to thereby give the required shape to the finished article.

7. In a grinding-machine, a grinding-surface, a work-holder, means to automatically reciprocate the work-holder, means to advance the grinding-surface toward the work-holder at the end of each stroke of the work-holder, said means including a lever and a cam for actuating said lever.

8. In a grinding-machine, a grinding-surface, a work-holder, means to reciprocate the work-holder, means to advance the grinding-surface toward the work-holder at the end of each reciprocation thereof, said means including a lever, and a stepped cam for actuating said lever, and a stop-motion controlled by the cam whereby the machine is stopped, when the cam has made a complete rotation.

9. In a grinding-machine, a grinding-surface, a work-holder, means to reciprocate the work-holder, means to advance the grinding-surface toward the work-holder at the end of each reciprocation thereof, said means including a stepped cam and a lever actuated thereby, and a templet controlling the position of the work to thereby give the requisite shape to the completed article.

10. In a grinding-machine, a grinding-surface, a work-holder, means to automatically advance one of said parts toward the other during the grinding operation, independent means for manually adjusting the position of one of said parts relative to the other, and a templet for guiding the work to and from the grinding-surface to thereby give the completed article the requisite shape.

11. In a grinding-machine, a grinding-surface, a reciprocating work-holder, and crank mechanism to impart to the work-holder a substantially uniform speed at every point of its stroke.

12. In a grinding-machine, a grinding-surface, a work-holder and means to reciprocate the work-holder at a substantially uniform speed at every point of its stroke, and to instantly reverse the same at the end of the stroke.

13. In a grinding-machine, a grinding-surface, a reciprocating work-holder, crank mechanism to impart to the work-holder a substantially uniform speed at every point of its stroke, and a templet controlling the position of the work relative to the grinding-surface.

14. In a grinding-machine, a grinding-surface, a reciprocating work-holder, means to give the work-holder a substantially uniform speed at every point of its stroke, a templet controlling the position of the work relative to the grinding-surface, and automatic means to advance the grinding-surface toward the work during the grinding operation.

15. In a grinding-machine, a grinding-surface, a work-holder, and means to reciprocate the same, said means including a differential crank-arm comprising two members, and means for giving one of said members a differential movement with respect to the other.

16. In a grinding-machine, a grinding-surface, a work-holder, and means to reciprocate the same, said means including a differential crank-arm comprising two members and a cam controlling the movements of one of said members relative to the other.

17. In a grinding-machine, a grinding-surface, a work-holder, and means to reciprocate the same at substantially the same speed at every point of the stroke, said means including a differential crank-arm comprising two members, gearing connecting the members thereof, and means for giving one member a varying differential movement with respect to the other.

18. In a grinding-machine, a grinding-surface, a work-holder, and means to reciprocate the same at substantially a uniform speed at every point of its stroke, said means including a differential crank-arm comprising two members, gearing connecting said members, a roll carried by said gearing, and a cam coöperating with said roll whereby one member of said crank-arm is given a varying differential movement with respect to the other.

19. In a grinding-machine, a grinding-surface, a work-holder, and means to reciprocate the same, said means including a shaft having a differential crank-arm comprising two members, one member being fast on said shaft and the other member being loose thereon, and means for giving the loose member a differential motion with respect to the other member.

20. In a grinding-machine, a grinding-surface, a work-holder, and means to reciprocate the same, said means including a shaft having a differential crank-arm comprising two members, one of said members being fast on the shaft and the other member loose thereon, gears connecting the two members, and a cam controlling the movement of the gears whereby the loose member is given a varying differential motion with respect to the other member.

21. In a grinding-machine, a grinding-surface, a work-holder, and means to reciprocate the same at a substantially uniform speed, said means including a shaft, a differential crank-arm, connected thereto, said crank-arm comprising two members, one member thereof being fast on the shaft while the other member is loose thereon, and is adjustably connected to the work-holder a segmental gear pivotally supported on said first-named member, a coöperating segmental gear fast on the loose member, and means for turning the gears, whereby the loose member is given a varying differential motion with respect to the other member.

22. In a grinding-machine, a grinding-surface, a work-holder, and means to reciprocate the same, said means including a shaft having a differential crank-arm comprising two members, one of said members being fast to the shaft and the other of said members being connected with the work-support, said members being flexibly connected together, and means for giving one of said members a differential motion with respect to the other.

23. In a grinding-machine, a grinding-surface, a work-holder, and means to reciprocate said work-holder, said means including a shaft having a differential crank-arm, comprising two members, one fast on said shaft and the other loose thereon, said loose member being connected to the work-holder, and means to give the loose member a forward differential motion with respect to the fast member at the ends of the stroke, and a backward differential motion at the central portions of the stroke, whereby the work-holder is given a substantially uniform speed at every point of its stroke.

24. In machines of the class specified, a reciprocating member, a shaft, a differential crank-arm mounted on said shaft, and connected to the reciprocating member, said crank-arm comprising two members one of which is fast on the shaft and the other of which is connected to the reciprocating member, and means to give one of said members a varying differential movement with respect to the other, whereby the reciprocating member is given a uniform speed at every point of its stroke.

25. In a grinding-machine, a grinding-surface, a work-holder, and means to reciprocate the same, said means including a shaft having attached thereto a differential crank-arm comprising a member fast upon the shaft, and a compensating member supported for movement relative to the first-named member, connections between said compensating member and the work-holder, and means for giving said compensating member a differential motion with respect to the other member of said differential crank-arm during the rotation of the shaft.

26. In a grinding-machine, a grinding-surface, a work-holder and means to reciprocate the same, said means including a rotary shaft having attached thereto a differential crank-arm comprising a member fast on the said shaft and a compensating member supported for turning movement relative to the first-named member, a pitman or other connection between the compensating member and the work-holder, and means for giving said compensating member a variable differential movement with respect to the other member of the crank-arm during the rotation of the shaft, whereby the work-holder is given a uniform speed of reciprocation.

27. In a grinding-machine, a grinding-surface, a work-holder, and means to reciprocate the same in front of the grinding-surface, said means including a rotary shaft having attached thereto a differential crank-arm comprising a member fast on the shaft, and a compensating member mounted for movement relative to the first-named member, a connection between said compensating member and the work-holder, and means for giving said compensating member a forward differential movement with respect to the other member as the work-holder approaches or recedes from the end of its stroke, and a backward differential movement at the central portion of its stroke, whereby the work-holder is given a substantially uniform speed at every point of its stroke.

28. In a grinding-machine, a reciprocating work-holder mounted to rock about an axis parallel to its direction of reciprocation, an arm connected to said work-holder, and a templet engaging said arm, whereby as the work-holder is reciprocated in front of the grinding-surface said work-holder is moved toward and from the grinding-surface.

29. In a grinding-machine, a grinding-surface, a reciprocating work-holder mounted to rock about an axis parallel to its direction of movement, an arm connected to said work-holder, a templet engaging said arm whereby as the work-holder is reciprocated in front of the grinding-surface it is rocked about its axis to move the work toward and from the grinding-surface and means to advance the grinding-surface toward the work-holder during the grinding operation.

30. In a grinding-machine, a grinding-surface, a reciprocating work-holder mounted to rock about an axis parallel to its direction of movement, an arm connected to said work-holder and a templet engaging said arm, whereby as the work-holder is reciprocated its position relative to the grinding-surface is varied, combined with automatic devices to advance the grinding-surface toward the work-holder at the end of each reciprocation thereof.

31. In a grinding-machine, a grinding-surface, a reciprocating work-holder mounted to rock about an axis parallel to its direction of movement, an arm connected to said work-holder and a templet engaging said arm whereby as the work-holder is reciprocated its position relative to the grinding-surface is varied, combined with automatic devices to advance the grinding-surface toward the work-holder at the end of each reciprocation thereof, and means to automatically stop the operation of the machine after the work-holder has made a predetermined number of reciprocations.

32. In a grinding-machine, a grinding-surface, a reciprocating work-holder, a series of independently-adjustable work-rests supported on said work-holder and adapted to support the work intermediate its ends.

33. In a grinding-machine, a grinding-surface, a reciprocating work-holder, said work-holder having head and tail stocks adapted to support the work therebetween, said headstock carrying means to rotate the work, and a series of independently-adjustable work-rests supported on the work-holder, and adapted to engage the work intermediate its ends.

34. In a grinding-machine, a grinding-surface, a work-holder mounted to rock about its axis parallel to its direction of movement, an arm connected to said work-holder, a templet engaging said arm, and means to reciprocate the said work-holder, said means comprising a shaft having attached thereto a differential crank-arm, comprising a member fast on the shaft, and a compensating member supported for movement relative to the first-named member, and means for giving said compensating member an accelerated differential movement with respect to the other member of the crank-arm as the work-holder approaches or recedes from the end of its stroke, and a retarded differential movement during the intermediate portion of its stroke.

In testimony whereof I have signed my name to this specification in the presence of two subscribing witnesses.

CHARLES F. ROPER.

Witnesses:
GEORGE OTIS DRAPER,
ERNEST W. WOOD.